Patented June 12, 1934

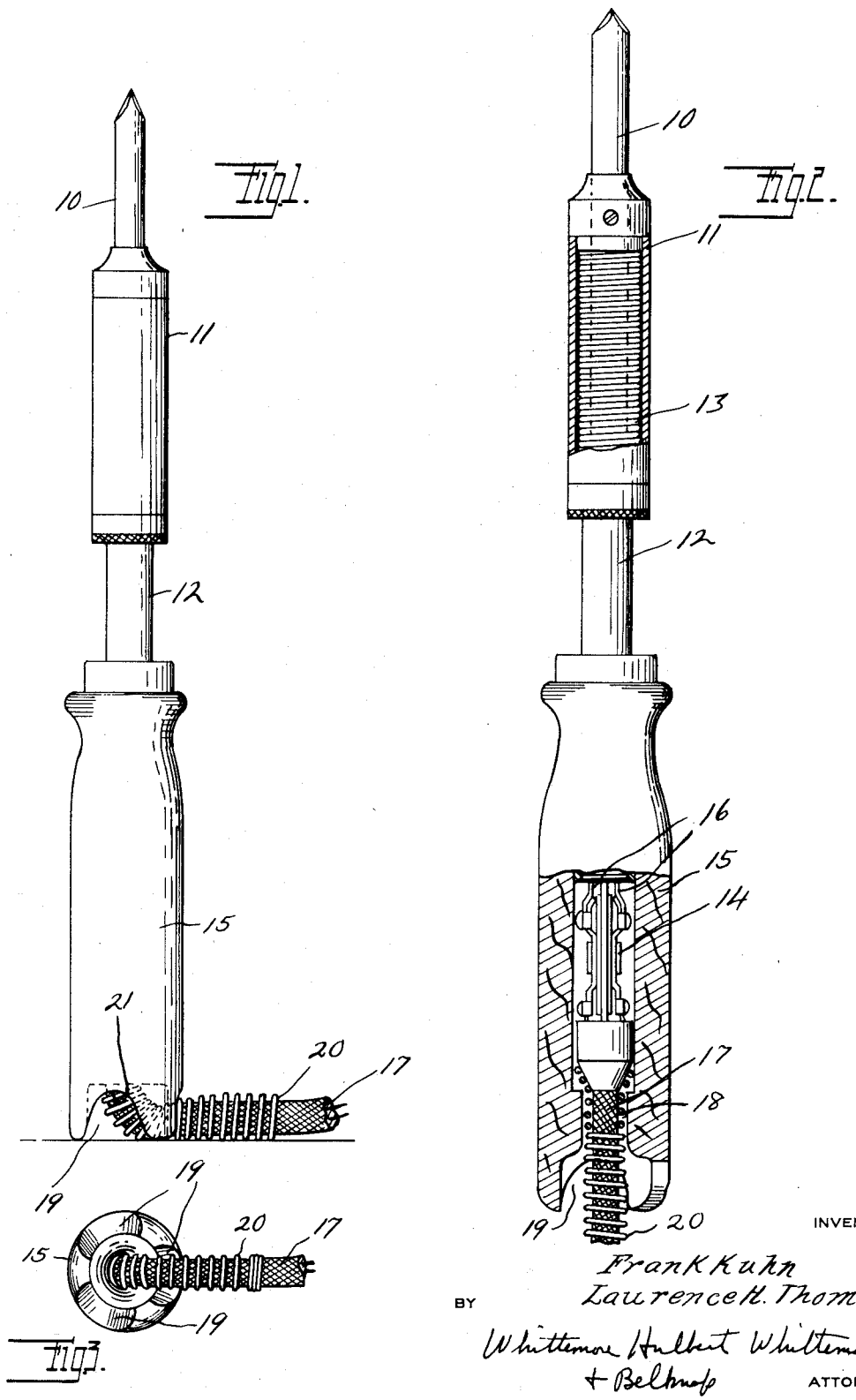

1,962,688

UNITED STATES PATENT OFFICE 1,962,688

SOLDERING IRON

Frank Kuhn, Detroit, and Laurence H. Thomas, Birmingham, Mich., assignors to American Electrical Heater Company, Detroit, Mich., a corporation of Michigan Application October 19, 1931, Serial No. 569,801

3 Claims. (Cl. 247—13)

This invention relates generally to electrical apparatus and refers more particularly to portable electrically operated devices having handle portions fashioned at the outer ends thereof for the reception of the usual flexible electrical cords.

Although the present invention may be used in connection with various different types of portable electrical apparatus, nevertheless, it finds particular utility when employed in association with electrically operated soldering irons of the type having gripping or handle portions provided with longitudinally extending bores in the outer ends thereof for receiving the necessary cords through which current is conveyed to the heating element of the irons.

Owing to the fact that the electrical cord usually extends centrally within the handle assembly of the iron, the same is relatively inaccessible and therefore difficult to replace in the event it becomes worn or faulty. It has been found in actual practice that considerable wear is imparted to the cord at the point the latter enters the handle due undoubtedly to the fact that operators in momentarily discontinuing the soldering operation frequently support the weight of the iron by resting the end of the handle on a support. It is obvious that in so supporting the iron, the cord is folded and crimped between the support and one edge of the handle assembly causing the insulation on the cord to become worn to such an extent as to require replacing the cord which, as previously stated, is a tedious and costly operation.

It is therefore one of the principal objects of the present invention to provide an improved handle assembly for portable electrical apparatus of the type outlined above so designed as to permit resting the end of the handle assembly upon a suitable support without any danger of wearing the insulation or crimping the same in the manner previously pointed out.

A further object of the present invention is to accomplish the foregoing result without materially increasing the cost of manufacture or interfering with the standard construction of the apparatus.

The foregoing as well as other objects will be made more apparent as this description proceeds, especially when considered in connection with the accompanying drawing, wherein:

Figure 1 is a side elevational view of an electrically operated soldering iron showing the same in an upright position with the end of the handle resting upon a suitable support;

Figure 2 is an enlarged view similar to Figure 1 with certain parts broken away for the sake of clearness;

Figure 3 is an end view of the construction illustrated in Figure 1.

For the purpose of illustration, we have shown our invention as employed in connection with an electrically operated soldering iron of the portable type having a handle or gripping portion whereby the same may be manipulated during use. The soldering iron selected herein for the purpose of illustration comprises a soldering tip 10 having the forward end thereof exposed to perform soldering operations and having the rear end thereof extending into a suitable casing 11 formed on the forward end of the shank 12 of the iron. As is usually the case, the tip 10 is heated by a heating element 13 located within the casing 11 and surrounding the rear portions of the tip as clearly shown in Figure 2 of the drawing. The heating element is electrically connected to terminal members 14 located within the handle 15 by means of the conductors 16 and the members are in turn electrically connected to a source of electric energy by means of a cord 17 adapted to be connected to a source of electric current and arranged to extend within an opening 18 through the outer end of the handle for connection with the members 14.

The handle 15 of the iron is secured to the rear end of the shank 12 and is preferably formed of a good electrical and heat insulating material so as to permit manipulation of the iron. As previously stated, the handle is so fastened as to permit resting the outer end thereof upon a support without unduly crimping the cord 17 or wearing the insulation of the cord 17. In the present instance, the foregoing result is obtained by forming a plurality of spaced open ended slots 19 through the sides of the handle at the outer or rear end thereof as clearly shown in Figures 1 and 3 of the drawing. As will be observed particularly from Figure 1 of the drawing, the slots 19 are of a width substantially greater than the width of the cord 17 with the guard 20 thereon so as to freely accommodate the cord and guard when the latter are extended laterally relative to the handle. It will further be apparent from the above figure that the length or axial dimension of the slots 19 is also substantially greater than the width of the cord so that when the latter is in engagement with any one of the slots, a space is provided between the cord 17 and adjacent end walls 21 of the slots. In other words, the foregoing arrangement is such that when the handle is seated upon a support in the upright position as shown in Figure 1 and the cord extended laterally relative to the handle, no pressure whatsoever is exerted upon the cord 17, and, furthermore, the portion of the cord adjacent the entrance to the opening 18 in the outer end of the handle is permitted to assume a smooth curve eliminating any tendency of unduly crimping the cord.

In addition to the above, it will be noted that the side walls of the recesses 19 are tapered outwardly so as to in effect serve to cam or guide the cord 17 alternatively into registration with one of the recesses upon supporting the handle in its upright position as shown in Figure 1. The inclination of the side walls of the recesses also serves to reduce the width of the outer ends of the portions of the handle between the slots to such an extent as to practically preclude crimping the cord between any one of these portions and the support upon tilting the iron to its upright position.

Thus, from the foregoing it will be apparent that we have provided an improved handle assembly for electrical apparatus of the general type outlined above capable of being held in an upright position with the outer end thereof resting upon a support without injury to the flexible electrical cord extending into the outer end of the same. It will further be apparent that we have accomplished the foregoing with a relatively simple and inexpensive construction requiring for its operation no attention whatsoever on the part of the operator.

What we claim as our invention is:

1. A handle for electric hand tools comprising a tubular handle grip for axially receiving a flexible current-carrying cord, the outer end of said handle being provided with a plurality of circumferentially spaced slots adapted to receive said flexible current carrying cord and means on said handle intermediate said recesses for causing said flexible cord to enter one of said slots when said handle is supported on its outer end.

2. A handle for an electric soldering iron comprising a tubular handle grip for axially receiving a flexible electric conducting cord, the outer end of said handle grip being provided with a plurality of circumferentially spaced projecting guards forming intermediate recesses for receiving said flexible cord, said guards being of an axial length to protect said cord when within one of said recesses and being fashioned to guide said cord into an adjacent recess when the end of the handle is brought into contact with an outside object.

3. A handle for an electric soldering iron comprising a tubular handle grip for axially receiving a flexible electric conducting cord, a protecting coil spring surrounding said cord and projecting from said handle grip, the outer end of said handle grip being provided with a plurality of circumferentially spaced projecting guards forming intermediate recesses for receiving said flexible cord and surrounding coil spring, said guards being of an axial length to protect said cord and spring when within said recesses and being tapered to guide said cord and spring into an adjacent recess when the end of the handle is brought into contact with an outside object.

FRANK KUHN.
LAURENCE H. THOMAS.